(12) United States Patent
Hori

(10) Patent No.: US 11,812,001 B2
(45) Date of Patent: Nov. 7, 2023

(54) INFORMATION PROCESSING METHOD, INFORMATION PROCESSING APPARATUS, AND STORAGE MEDIUM

(71) Applicant: CANON KABUSHIKI KAISHA, Tokyo (JP)

(72) Inventor: Daisuke Hori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/852,148

(22) Filed: Jun. 28, 2022

(65) Prior Publication Data

US 2022/0417386 A1 Dec. 29, 2022

(30) Foreign Application Priority Data

Jun. 29, 2021 (JP) ................................ 2021-108170

(51) Int. Cl.
*H04N 1/387* (2006.01)
*G06F 3/12* (2006.01)

(52) U.S. Cl.
CPC ......... *H04N 1/3875* (2013.01); *G06F 3/1205* (2013.01); *G06F 3/1256* (2013.01); *G06F 3/1258* (2013.01)

(58) Field of Classification Search
CPC ... H04N 1/3875; G06F 3/1205; G06F 3/1256; G06F 3/1258; G06F 3/1208; G06F 3/1285
See application file for complete search history.

(56) References Cited

U.S. PATENT DOCUMENTS

| 2007/0024874 A1* | 2/2007 | Kawamura | H04N 1/233 358/1.13 |
| 2011/0141492 A1* | 6/2011 | Ebuchi | H04N 1/3875 358/1.2 |
| 2016/0124691 A1* | 5/2016 | Nouda | G06F 3/1285 358/1.18 |
| 2019/0361649 A1* | 11/2019 | Hori | G06F 3/1254 |

FOREIGN PATENT DOCUMENTS

JP 2016091231 A 5/2016

* cited by examiner

*Primary Examiner* — Iriana Cruz
(74) *Attorney, Agent, or Firm* — Canon U.S.A., Inc. IP Division

(57) ABSTRACT

In a method for always displaying a borderless protrusion area, which is an area for achieving borderless printing, when a borderless printing function is used, the display is not necessarily appropriate display depending on the application of the user. Setting for receiving a setting for enabling borderless printing, displaying control for displaying an editing screen including an image as an editing target and a recording medium area, and controlling for, in a case where the borderless printing is set and an operation on the editing screen is received, displaying an object indicating an area for the borderless printing outside the recording medium area on the editing screen, and in a case where the operation on the editing screen is not received, not displaying the object indicating the area for the borderless printing outside the recording medium area on the editing screen are executed.

21 Claims, 11 Drawing Sheets

FIG.7

| | EDITING OPERATION | EXAMPLES OF EDITING OPERATION | PRINT LAYOUT REPRESENTATION |
|---|---|---|---|
| (a) | PERFORMED | — | HIDE AREAS OF IMAGE OUTSIDE SHEET |
| (b) | NOT PERFORMED | OPERATION INCAPABLE OF MAKING FINE CORRECTIONS REGARDING LAYOUT (FIT, FIT WITHOUT MARGIN, OR COLOR PROCESSING) | |
| (c) | | OPERATION CAPABLE OF MAKING FINE CORRECTIONS REGARDING LAYOUT (MOVEMENT, ENLARGEMENT/REDUCTION, CROPPING, OR ROTATION OF IMAGE) | TRANSLUCENTLY DISPLAY AREAS OF IMAGE OUTSIDE SHEET ALSO DISPLAY BORDERLESS PROTRUSION AREA IN BORDERLESS PRINTING |

INFORMATION PROCESSING METHOD, INFORMATION PROCESSING APPARATUS, AND STORAGE MEDIUM

BACKGROUND

Field of the Disclosure

The present disclosure relates to an information processing method, an information processing apparatus, and a storage medium.

Description of the Related Art

The function of printing data on an image in the state where a margin is not present in end portions on at least two sides of a sheet area (hereinafter, "borderless printing") is known. In a printing apparatus, an area for achieving the borderless printing (hereinafter, a "borderless protrusion area") is provided. For example, the publication of Japanese Patent Application Laid-Open No. 2016-91231 discusses a technique for displaying a borderless protrusion area on a screen of an information processing apparatus.

However, for example, in a method for always displaying a borderless protrusion area when a borderless printing function is used as discussed in the publication of Japanese Patent Application Laid-Open No. 2016-91231, the display is not necessarily appropriate display depending on the application of the user.

SUMMARY

The present disclosure is directed to performing appropriate display for a user when a borderless printing function is used.

According to an aspect of the present disclosure, there is provided an information processing method including setting for receiving a setting for enabling borderless printing, displaying control for displaying an editing screen including an image as an editing target and a recording medium area, and controlling for, in a case where the borderless printing is set and an operation on the editing screen is received, displaying an object indicating an area for the borderless printing outside the recording medium area on the editing screen, and in a case where the operation on the editing screen is not received, not displaying the object indicating the area for the borderless printing outside the recording medium area on the editing screen.

Further features of the present disclosure will become apparent from the following description of exemplary embodiments with reference to the attached drawings.

BRIEF DESCRIPTION OF THE DRAWINGS

FIG. 7 is a table illustrating print layout representation to be displayed according to an editing content.

DESCRIPTION OF THE EMBODIMENTS

With reference to the drawings, the present disclosure will be described in detail below. The following exemplary embodiments do not limit the present disclosure according to the appended claims, and not all the combinations of the features described in the present exemplary embodiments are essential for a method for solving the issues in the present disclosure. In the attached drawings, the same component or a similar component is designated by the same reference number, and is not redundantly described.

Figure 1:
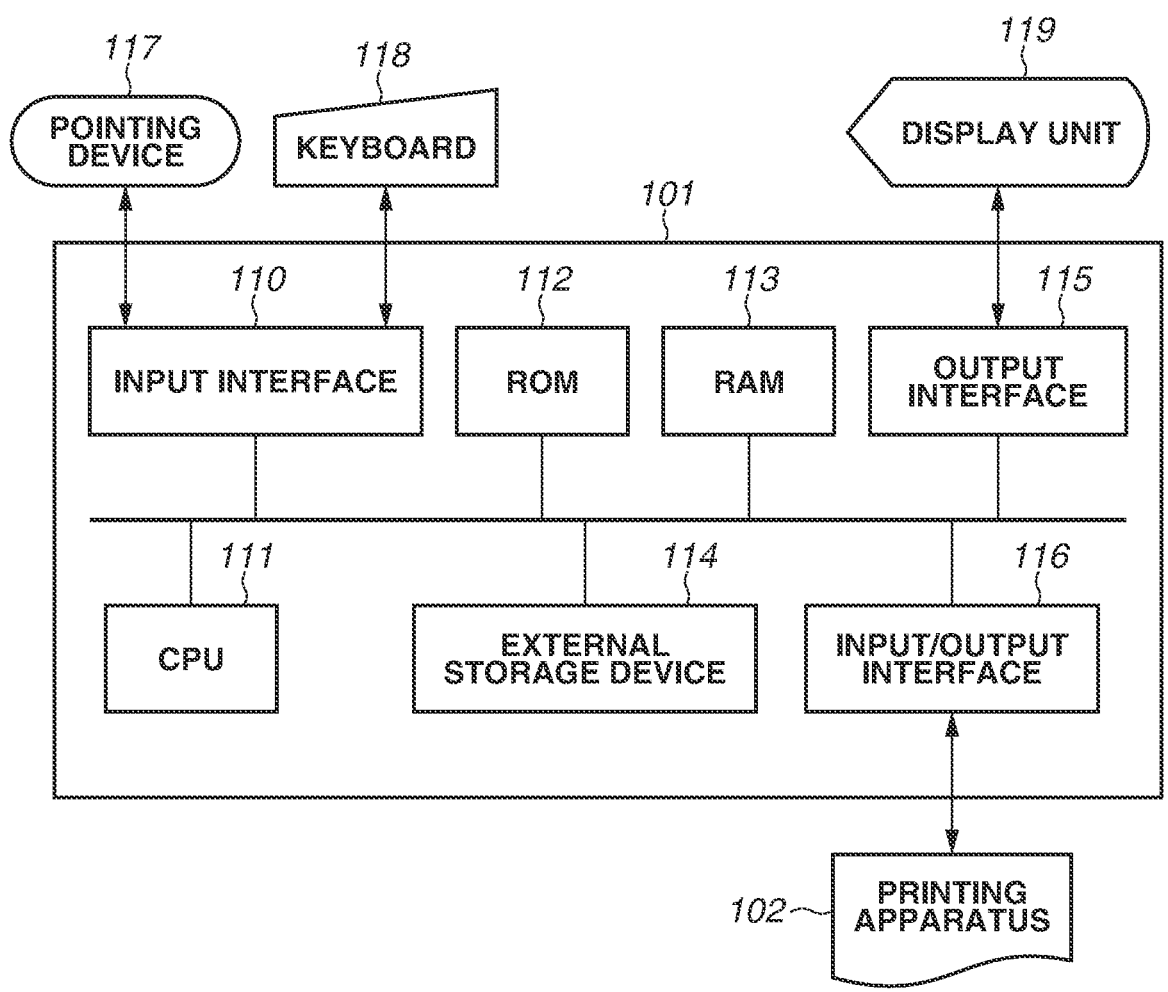
FIG. 1 is a diagram illustrating a hardware configuration of a printing system.

FIG. 1 is a diagram illustrating the hardware configuration of a printing system according to a first exemplary embodiment. The configuration of the system according to the present exemplary embodiment includes a host computer (hereinafter, "host") 101 as an information processing apparatus, and a printing apparatus (hereinafter, "printer") 102. The host 101 includes an input interface 110, a central processing unit (CPU) 111, a read-only memory (ROM) 112, a random-access memory (RAM) 113, an external storage device 114, an output interface 115, and an input/output interface 116. To the input interface 110, input devices such as a keyboard 118 and a pointing device 117 are connected. To the output interface 115, a display device such as a display unit 119 is connected. The ROM 112 stores an initialization program. The external storage device 114 stores a group of application programs, an operating system (OS), a printer driver, and various other types of data. The RAM 113 is used as a work memory for executing various programs stored in the external storage device 114. In the present exemplary embodiment, the functions of the host 101 described below and processing regarding flowcharts described below are executed by the CPU 111 performing processing according to the procedure of a program stored in the external storage device 114.

In the system illustrated in FIG. 1, the printer 102 and the host 101 are connected to each other via the input/output interface 116. For example, the communication method used to connect the apparatuses is based on a communication standard (Wi-Fi) of the Institute of Electrical and Electronics Engineers (IEEE) 802.11 series or Bluetooth® (Bluetooth® Classic or Bluetooth® Low Energy). In the printing system according to the present exemplary embodiment, a form may be employed in which the printer 102 and the host 101 are not directly connected to each other. Specifically, for example, the apparatuses may be connected to a wireless local area network (LAN) router based on Wi-Fi and communicate with each other through the Internet communication via the wireless LAN router.

Alternatively, the apparatuses may communicate with each other through mobile communication (3G, 4G, or 5G).

For example, the host 101 is a personal computer (PC). The present disclosure, however, is not limited to this. Any of various devices such as a smartphone and a digital camera may also be applied as the host 101 according to the present exemplary embodiment. The printing method of the printer 102 used in the present exemplary embodiment may be an electrophotographic method, an inkjet method, or another method.

Figure 2:
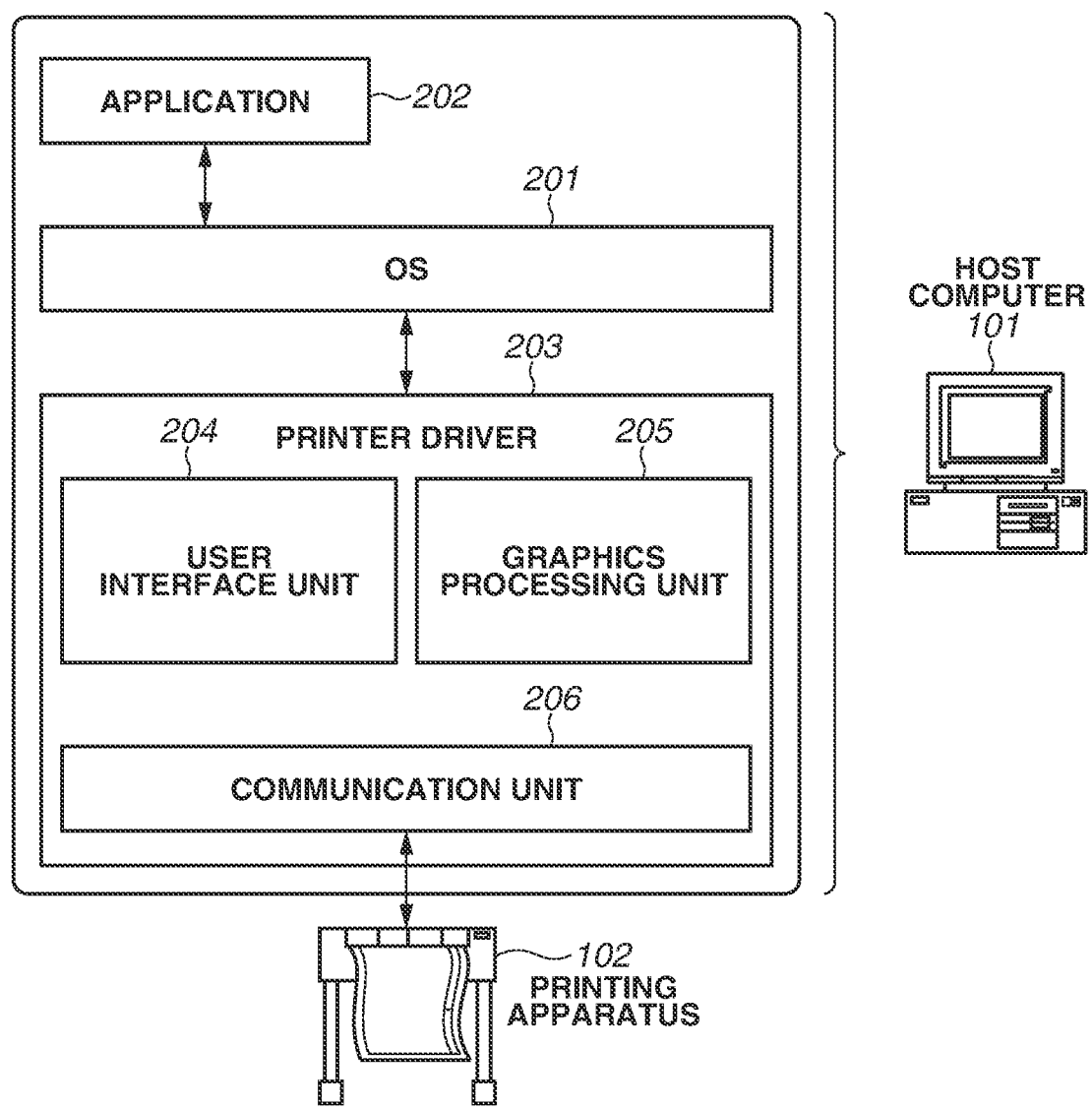
FIG. 2 is a diagram schematically illustrating a configuration of the printing system.

FIG. 2 is a diagram schematically illustrating the configuration of the printing system. The external storage device 114 stores an OS 201, an application 202, and a printer driver 203. The application 202 is software, that gives an instruction to print data on an image or a character that is arranged (laid out). For example, the application 202 is equivalent to an image editing application that creates a poster, a photograph, a photo book, or a New Year's card. A user creates data for performing printing on the application 202 and then makes various print settings for the printer driver 203 provided by the vendor of the printer 102, A screen for making the print settings is displayed by a user interface unit 204 called by the application 202 via the OS 201. On the print setting screen, the user can make settings required for various types of printing, such as the specifying of a sheet size and the setting of borderless printing. Alternatively, using a function of the OS 201 such as PrintTicket or PrintCapabilities, the application 202 can also receive a print setting change instruction directly from the user on a screen of the application 202 without displaying the print setting screen.

After the print settings are completed, the user presses a "print" button on the application 202, thereby instructing the application 202 to execute printing. Based on the print instruction from the user, the application 202 creates print data and passes the print data to a graphics processing unit 205 of the printer driver 203 via the OS 201. The graphics processing unit 205 performs color processing and rendering on the print data, then generates a print job in a data format that can be interpreted by the printer 102, and transmits the print job to the printer 102 via a communication unit 206. Then, the printer 102 executes a printing process based on the print job, thereby printing data such as an image corresponding to the print job on a recording medium. Although a print job is generated using the printer driver 203 in the description of the present exemplary embodiment, another piece of software may generate a print job. For example, the vendor of the printer 102 may provide print job generation software that generates a print job that can be interpreted by the printer 102, instead of the printer driver 203, and the print job generation software may generate a print job.

Borderless printing, which is one of the functions of the application 202, is described.

The Borderless printing is the function of enabling image data to be printed without generating a margin (a border) in end portions on at least two sides of a sheet. In the borderless printing, it is necessary to cause an image to protrude from a sheet area. The image is caused to protrude from the sheet area to perform the borderless printing, whereby it is possible to print the image without generating a border in end portions on at least two sides of the sheet. Thus, the application 202 displays an object indicating an area for the borderless printing (hereinafter, a "borderless protrusion area"), which indicates how much it is necessary to cause the image to protrude from the sheet area to perform the borderless printing.

However, in a form in which the object indicating the borderless protrusion area is displayed ever time the borderless printing is performed, the display is not necessarily appropriate display depending on the application of the user.

For example, a user who wishes to confirm the completed form of an image to be ultimately printed without using the borderless protrusion area may not be able to appropriately confirm (grasp) the completed form of the image due to the presence of the object indicating the borderless protrusion area. Moreover, for example, for a user who does not recognize the borderless protrusion area, visibility decreases due to the presence of the object indicating the borderless protrusion area, and therefore, usability decreases.

In response, in the present exemplary embodiment, in a case where an operation on an editing screen of the application 202 is performed, areas of an image that protrude from sheet areas and an object indicating a borderless protrusion area are displayed. Consequently, appropriate display is performed according to the operation of the user. This improves visibility and therefore improves usability in a case where an operation regarding an image is performed.

In the present exemplary embodiment, in a case where among operations on the editing screen of the application 202, an editing operation capable of making fine corrections regarding the layout of image as a printing target is performed, areas of the image that protrude from sheet areas and an object indicating a borderless protrusion area are displayed. Consequently, appropriate display is performed according to the content of the operation of the user. This improves visibility and therefore improves usability in a case where an operation regarding the layout of an image is performed.

Figure 3:
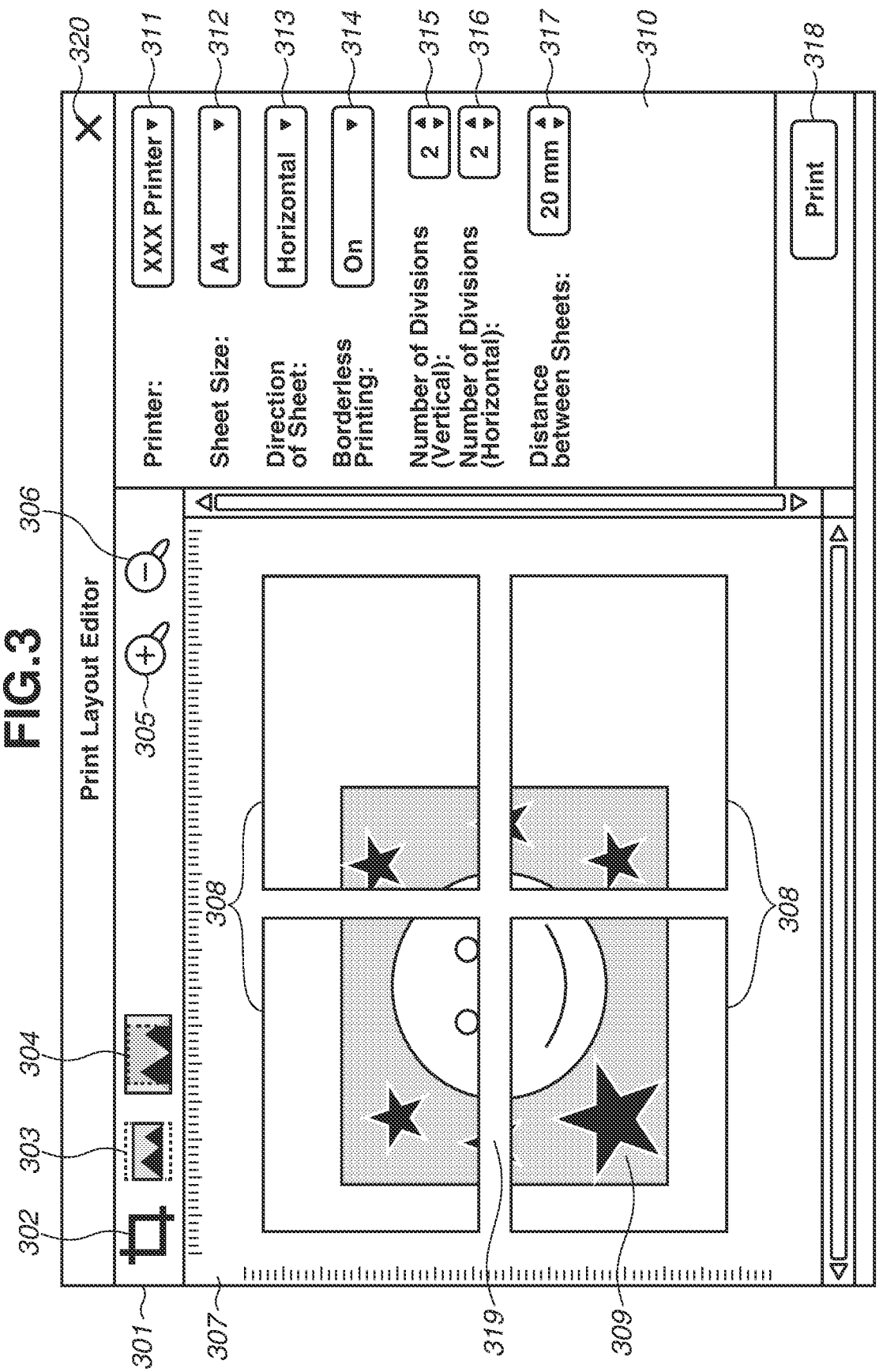
FIG. 3 is an example of an application screen.

FIG. 3 is a diagram illustrating an example of a screen provided by the application 202 capable of giving an instruction to perform huge poster printing (hereinafter, "divided poster printing") by printing a single image in a divided manner on a plurality of sheets. The application 202, however, may be any application capable of performing the borderless printing. For example, the application 202 may be a photo book creation application, a photograph editing application, or a New Year's card creation application.

Figure 4:
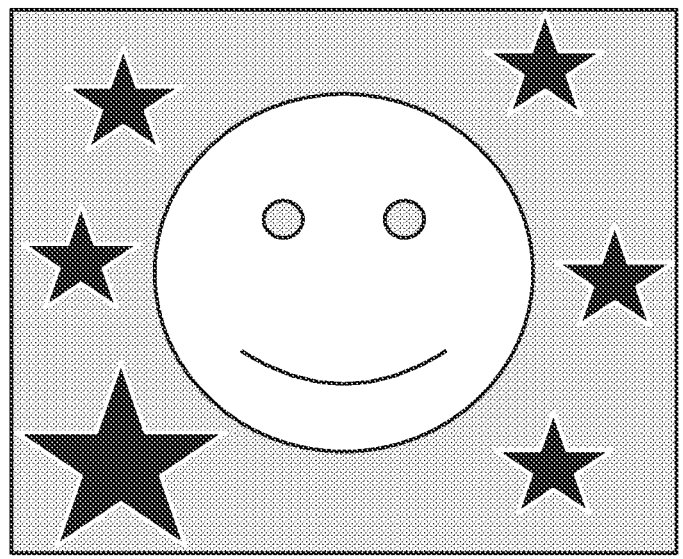
FIG. 4 is an example of an input image.

In the present exemplary embodiment, an image in FIG. 4 is input by the user. Although the method for inputting the image is not particularly illustrated, examples of the method include a method in which the user opens an explorer from a file menu of the application 202 and inputs an image, and a method for dragging an image and dropping the image onto an icon of the application 202, thereby inputting the image. The format of the image may be any format that can be interpreted by the application 202. For example, the format can be an image format such as Bitmap or a Tagged Image File Format (Tiff). Alternatively, the format may be a vector format such as Extensible Markup Language (XML) Paper Specification (XPS) or an Enhanced Metafile (EMF).

An area 301 is a toolbar area and includes a "crop" button 302, a "fit" button 303, a "fit without margin" button 304, a "change display magnification" button (enlargement) 305, and a "change display magnification" button (reduction) 306. The "crop" button 302 is a button for cropping an image 309. For example, the user presses the button 302 and then drags the four corners of the image 309, thereby cropping the image 309 (executing the operation of clipping the image 309). The "fit" button 303 and the "fit without margin" button 304 will be described in detail below, and therefore are not described here. The "change display magnification" button (enlargement) 305 and the "change display magnification" button (reduction) 306 are control units for changing the display magnification of a preview area 307. For example, if the user indicates the "change display magnification" button (enlargement) 305, the application 202 displays the image 309 by increasing the display magnification. If, on the other hand, the user indicates the "change display magnification" button (reduction) 306, the application 202 displays the image 309 by decreasing the display magnification.

The area 307 is a preview area and is an area where sheet areas 308 and the image 309 laid out by the user are displayed. The areas 308 are sheet areas. In the present exemplary embodiment, the sheet areas 308 are occasionally also referred to as "recording medium areas". The application 202 displays the sheet areas 308 to be subjected to printing by the printer 102 according to the setting values of a "sheet size" setting 312, a "direction of sheet" setting 313, a "borderless printing" setting 314, "number of divisions" settings 315 and 316, and a "distance between sheets" setting 317. As illustrated in FIG. 3, rulers can also be displayed in the preview area 307. Using the rulers, the user can accurately confirm at which positions in the sheets the image 309 is placed. The user can also perform editing operations such as the movement, the enlargement and reduction (hereinafter, "enlargement/reduction"), and the cropping of the image 309 on the preview area 307. This enables the user to finely adjust the layout of the image 309, such as the position and the size of the image 309.

An area 310 is an editing setting area and includes a "printer" setting 311, a "sheet size" setting 312, a "direction of sheet" setting 313, a "borderless printing" setting 314, a "number of divisions" setting (vertical) 315, a "number of divisions" setting (horizontal) 316, and a "distance between sheets" setting 317. The "printer" setting 311 is a combo box that receives the specifying of the printer 102 (the printer driver 203) for use in printing. The printer driver 203 corresponding to the printer 102 specified in the "printer" setting 311 generates a print job. The "sheet size" setting 312 is a combo box that receives the specifying of a sheet size for use in printing. Using a function of the OS 201 such as PrintCapabilities, the application 202 can acquire sheet size information regarding a sheet size that can be set in the "sheet size" setting 312 from the printer driver 203 corresponding to the printer 102 selected in the "printer" setting 311. The sheet size information acquired by this process is displayed as an option in the "sheet size" setting 312. The "direction of sheet" setting 313 is a combo box that receives the specifying of the direction of the sheet (vertical or horizontal). The "borderless printing" setting 314 will be described in detail below, and therefore is not described here. The "number of divisions" settings 315 and 316 are spin boxes that receive the specifying of the number of divisions of the image required to perform the divided poster printing. The specified number of divisions matches the number of sheets for use in printing. Thus, the greater the specified number of divisions is, the larger the size of the entirety of the divided poster is. The "distance between sheets" setting 317 is a spin box that receives the specifying of the amount of space (an inter-sheet area 319) between sheets. After the divided poster printing is executed, the user sticks the sheets subjected to the printing on a wall by separating the sheets by the value specified in the "distance between sheets" setting 317.

Thus, the amount of space is specified in the "distance between sheets" setting 317, whereby the user can set up the divided poster without the deterioration of appearance due to the bonding together of the sheets. In the present exemplary embodiment, a description is given of an exemplary embodiment in which the sheets are set up by separating the sheets. Alternatively, the processing according to the present exemplary embodiment may be applied to an exemplary embodiment in which the sheets are set up by bonding parts of the sheets together in an overlapping manner.

As a specific example, in FIG. 3, "A4" is specified in the "sheet size" setting 312, "horizontal" is specified in the "direction of sheet" setting 313, "2" is specified in the "number of divisions" setting (vertical) 315, "2" is specified in the "number of divisions" setting (horizontal) 316, and "20 mm" is specified in the "distance between sheets" setting 317. In the preview area 307, a preview image on which the above specifying is reflected is displayed. In this case, according to the specified number of divisions, a total of four sheet areas 308 in two vertical columns and two horizontal rows are displayed such that the size of each sheet area 308 is "A4", and the direction of the sheet is "horizontal". The application 202 displays the sheet areas 308 in the state where an area equivalent to 20 mm on display is provided between the sheet areas 308. The user places the image 309 at any positions in the sheet areas 308 and thereby can specify the placement of the image 309 in the divided poster printing. On the screen in FIG. 3, a "print" button 318 is provided. If the "print" button 318 is pressed, the application 202 transmits setting information set in the editing setting area 310 to the printer driver 203 corresponding to the printer 102. Further, the application 202 transmits print data including layout information (including image data) regarding the sheet areas 308 edited (operated) by the user to the printer driver 203 corresponding to the printer 102, In the example of FIG. 3, the image 309 is divided, and a total of four sheets are subjected to printing. An area other than the sheet areas 308 is not subjected to printing, and therefore, the inter-sheet area 319 specified in the "distance between sheets" setting 317 is not subjected to printing.

With reference to FIGS. 5A to 5G, the "borderless printing" setting 314, the "fit" button 303, and the "fit without margin" button 301 are described. FIGS. 5A to 5G are examples of print layout representation displayed in the preview area 307 on the screen of the application 202 when the "borderless printing" setting 314, the "fit" button 303, and the "fit without margin" button 304 are pressed. In FIGS. 5A to 5G, the image illustrated in FIG. 4 is displayed as the image 309, and the sheet areas 308 are displayed according to the setting "horizontal" in the "direction of sheet" setting 313 and the settings "2" and "2" in the "number of divisions" settings 315 and 316, respectively.

Figure 5A:
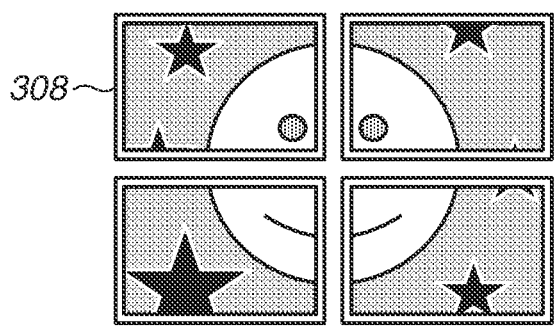
FIGS. 5A to 5G are examples of print layout representation displayed on the application screen.

The "borderless printing" setting 314 in FIG. 3 is a combo box that receives the specifying (setting) of a borderless printing function. For example, the user selects either of "on" and "off" from a pull-down menu of the "borderless printing" setting 314 and thereby can switch "on" and "off" in the "borderless printing" setting 314. With reference to FIG. 5A, the "borderless printing" setting 311 is described.

Figure 5B:
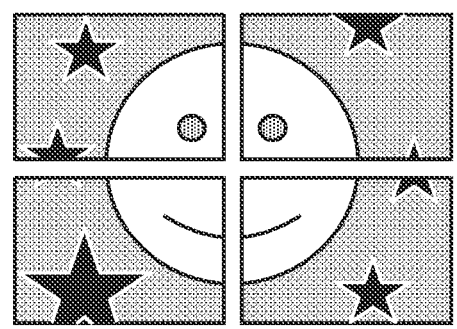

If the "borderless printing" setting 314 is "off", then as illustrated in FIG. 5A, a margin area (hereinafter, a "border" or a "printer margin") is provided in end portions on the four sides of each of the sheet areas 308. If the "borderless printing" setting 314 is "on", for example, as illustrated in FIG. 5B, the border is not provided in the end portions on the four sides of each of the sheet areas 308. It is not that the application 202 prevents the generation of a margin in the end portions on the four sides of each of the sheet areas 308 based on the pressing of "on" in the "borderless printing" setting 314. The user sets the "borderless printing" setting 314 to "on" and performs the operation of causing the image 309 to protrude outside a borderless protrusion area to prevent the generation of a margin in the end portions on the four sides of each of the sheet areas 308, and thereby can perform the borderless printing. Using a function of the OS 201 such as PrintCapabilities, the application 202 can acquire information regarding the value of the printer margin and the value of a borderless protrusion area required for the borderless printing from the printer driver 203. Consequently, the application 202 can display the border and an object indicating the borderless protrusion area for performing the borderless printing at accurate positions on the preview area 307.

The "fit" button 303 and the "fit without margin" button 304 in FIG. 3 are buttons for automatically overlapping (hereinafter, "fitting") at least two sides of the image 309 and at least two sides inside the border provided in the end portions on the four sides of each of the sheet areas 308. The "fit" button 303 and the "fit without margin" button 304 in FIG. 3 are also buttons for fitting at least two sides of the image 309 and at least two sides of an object indicating a borderless protrusion area 501 of the entirety of the sheet. The case where at least two sides of the image 309 and at least two sides inside the border provided in the end portions on the four sides of each of the sheet areas 308 are fitted to each other is a ease where the "fit" button 303 or the "fit without margin" button 304 is pressed and the "borderless printing" setting 314 is set to "off". A specific description is given below of a case where the "fit" button 303 or the "fit without margin" button 304 is pressed and the "borderless printing" setting 314 is set to "on". That is, a case is described where at least two sides of the image 309 and at least two sides of the object indicating the borderless protrusion area 501 of the entirety of the sheet are fitted to each other. After a printing area is determined by pressing "on" or "off" in the "borderless printing" setting 314, the image 309 is fitted by pressing the "fit" button 303 or the "fit without margin" button 304. However, a form may be employed in which the image 309 is fitted in a determined printing area also in a different order.

Figure 5C:
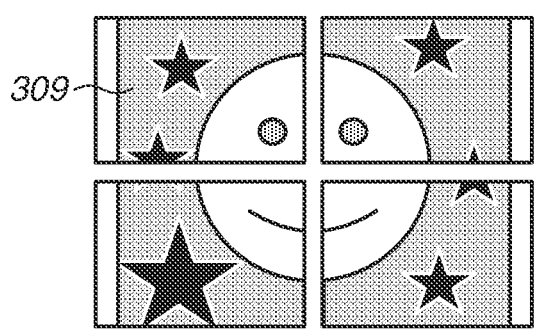

FIG. 5C is an example of the preview area 307 displayed on the screen of the application 202 in a case where the "fit" button 303 is pressed and the "borderless printing" setting 314 is set to "on", FIG. 5B is an example of the preview area 307 displayed on the screen of the application 202 in a ease where the "fit without margin" button 304 is pressed and the "borderless printing" setting 314 is set to "on".

Figure 5D:
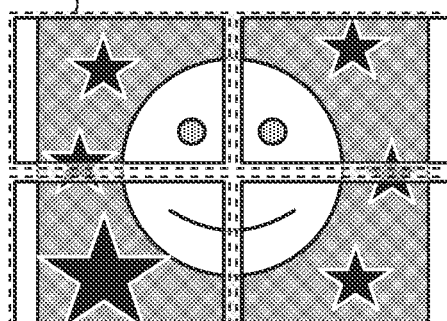
Figure 5E:
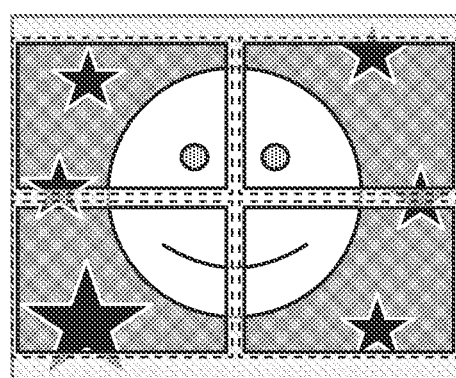

A description is given of a layout state obtained by a fit executed by pressing the "fit" button 303 and a layout state obtained by a fit executed by pressing the "fit without margin" button 304. Specifically, these layout states are illustrated in FIGS. 5D and 5E. FIG. 5D is a diagram illustrating a layout state corresponding to FIG. 5C, and FIG. 5E is a diagram illustrating a layout state corresponding to FIG. 5B. FIGS. 5D and 5E are diagrams illustrating an object (a dotted line) indicating a borderless protrusion area 501 in each of the four sheet areas 308 in addition to FIGS. 5C and 5B, respectively. Further, areas of the image 309 that protrude outside from the sheet areas 308 are translucently displayed. FIGS. 5D and 5E are also examples of display regarding an image that is changed according to an editing operation of the user on the preview area 307 described below with reference to FIGS. 6 and 7, but are used to describe the "fit" button 303 and the "fit" button 304 here.

The "borderless protrusion area 501" refers to an area required to certainly perform printing without a border, regardless of the distortion of a medium or a conveyance error in the printer 102. Specifically, the borderless protrusion area 501 is an area for preventing the generation of a border in end portions on at least two sides of a print product in a case where printing is executed according to a print job generated from print data based on the image 309 as an editing target. The borderless protrusion area 501 is also equivalent to a printing area when the printer 102 performs printing by protruding from a sheet using a print job generated from print data on the image 309 as the editing target. Further, in a case where an instruction to print the image 309 as the editing target is given, print data (or a print job) is generated based on the image 309 corresponding to the borderless protrusion area 501 placed outside each of the sheet areas 308. That is, the image 309 is placed by protruding outside the dotted line indicating the borderless protrusion area 501 from each of the sheet areas 308, whereby it is possible to achieve the borderless printing without a border. The dotted line indicating the borderless protrusion area 501 is present with respect to each sheet area 308. However, in a case where there is a plurality of sheet areas 308, only a dotted line indicating the borderless protrusion area 501 for the entirety of the sheet may be present. The "borderless protrusion area 501 for the entirety of the sheet" refers to a single borderless protrusion area 501 displayed in a case where the four sheet areas 308 are regarded as a single sheet area. A switching may be able to be made between a form in which the dotted line indicating the borderless protrusion area 501 is displayed with respect to each sheet area 308, and a form in which only the dotted line indicating the borderless protrusion area 501 for the entirety of the sheet is displayed.

If the "fit" button 303 is pressed, the four (all) sides of the image 309 fall within the borderless protrusion area 501 for the entirety of the sheet. Then, at least any two of the top, bottom, left, and right sides of the image 309 and any two of the top, bottom, left, and right sides of the dotted line indicating the borderless protrusion area 501 for the entirety of the sheet fit each other. For example, as illustrated in FIG. 5D, the top and bottom two sides of the image 309 and the top and bottom two sides of the dotted line indicating the borderless protrusion area 501 for the entirety of the sheet fit each other. If the "fit without margin" button 304 is pressed, two sides of the image 309 fall within the borderless protrusion area 501 for the entirety of the sheet. Then, at least any two of the top, bottom, left, and right sides of the image 309 and any two of the top, bottom, left, and right sides of the dotted line indicating the borderless protusion area 501 for the entirety of the sheet fit each other. If the "fit without margin" button 304 is pressed, the remaining two sides that do not fit the borderless protrusion area 501 for the entirety of the sheet may be placed outside the borderless protrusion area 501 for the entirety of the sheet. That is, the "fit without margin" button 304 is the function of overlapping two sides of the image 309 and two sides of the dotted line indicating the area 501 for the borderless printing and enabling the other two sides of the image 309 to be placed outside the area 501 for the borderless printing. For example, as illustrated in FIG. 5E, the left and right two sides of the image 309 and the left and right two sides of the dotted line indicating the borderless protrusion area 501 for the entirety of the sheet fit each other, and the top and bottom two sides of the image 309 are placed outside the borderless protrusion area 501.

A specific description is given of the difference between the fit executed by pressing the "fit" button 303 and the fit executed by pressing the "fit without margin" button 304.

First, the fit executed by pressing the "fit" button 303 (hereinafter, an "inscribed fit") is specifically described. The inscribed fit is the function of overlapping any two of the top, bottom, left, and right sides of the image 309 and any two of the top, bottom, left, and right sides of the dotted line indicating the borderless protrusion area 501 for the entirety of the sheet so that the four (all) sides of the image 309 fall within the borderless protrusion area 501 for the entirety of the sheet. Further, the inscribed fit places the image 309 in the center of the borderless protrusion area 501 for the entirety of the sheet. That is, the entirety of the image 309 falls within the borderless protrusion area 501. In the inscribed fit, a margin may be generated in the borderless protrusion area 501 for the entirety of the sheet depending on the aspect ratio of the image 309 or the aspect ratio of each sheet area 308.

Next, with reference to FIG. 5E, the fit executed by pressing the "fit without margin" button 304 (hereinafter, a "circumscribed fit") is specifically described. As described above, the circumscribed fit is the function of overlapping two sides of the image 309 and two sides of the dotted line indicating the area 501 for the borderless printing and enabling the other two sides of the image 309 to be placed outside the area 501 for the borderless printing. Thus, as illustrated in FIG. 5E, the circumscribed fit overlaps the left and right two sides of the image 309 and the left and right two sides of the dotted line indicating the protrusion area 501 for the entirety of the sheet and places the top and bottom two sides of the image 309 outside the area 501 for the borderless printing. Further, the circumscribed fit places the image 309 in the center of the borderless protrusion area 501 for the entirety of the sheet. As a result, the borderless printing can be executed without generating a margin in a border on at least two sides of the sheet. That is, in the circumscribed fit, the image 309 may protrude outside from the borderless protrusion area 501 depending on the aspect ratio of the image 309 or the aspect ratio of each sheet area 308. Specifically, a partial area of the image 309 including the two sides that do not fall within the borderless protrusion area 501 for the entirety of the sheet may protrude outside from the borderless protrusion area 501 for the entirety of the sheet.

Figure 5F:
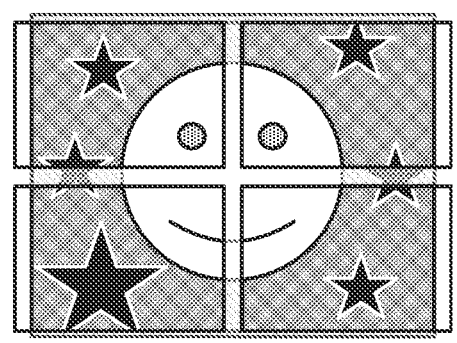
Figure 5G:
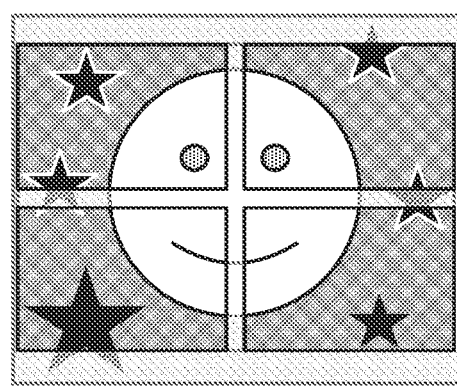

FIGS. 5F and 5G are examples of display regarding an image that is changed according to an editing operation of the user on the preview area 307, but this will be described below with reference to FIGS. 6 and 7.

Figure 6:
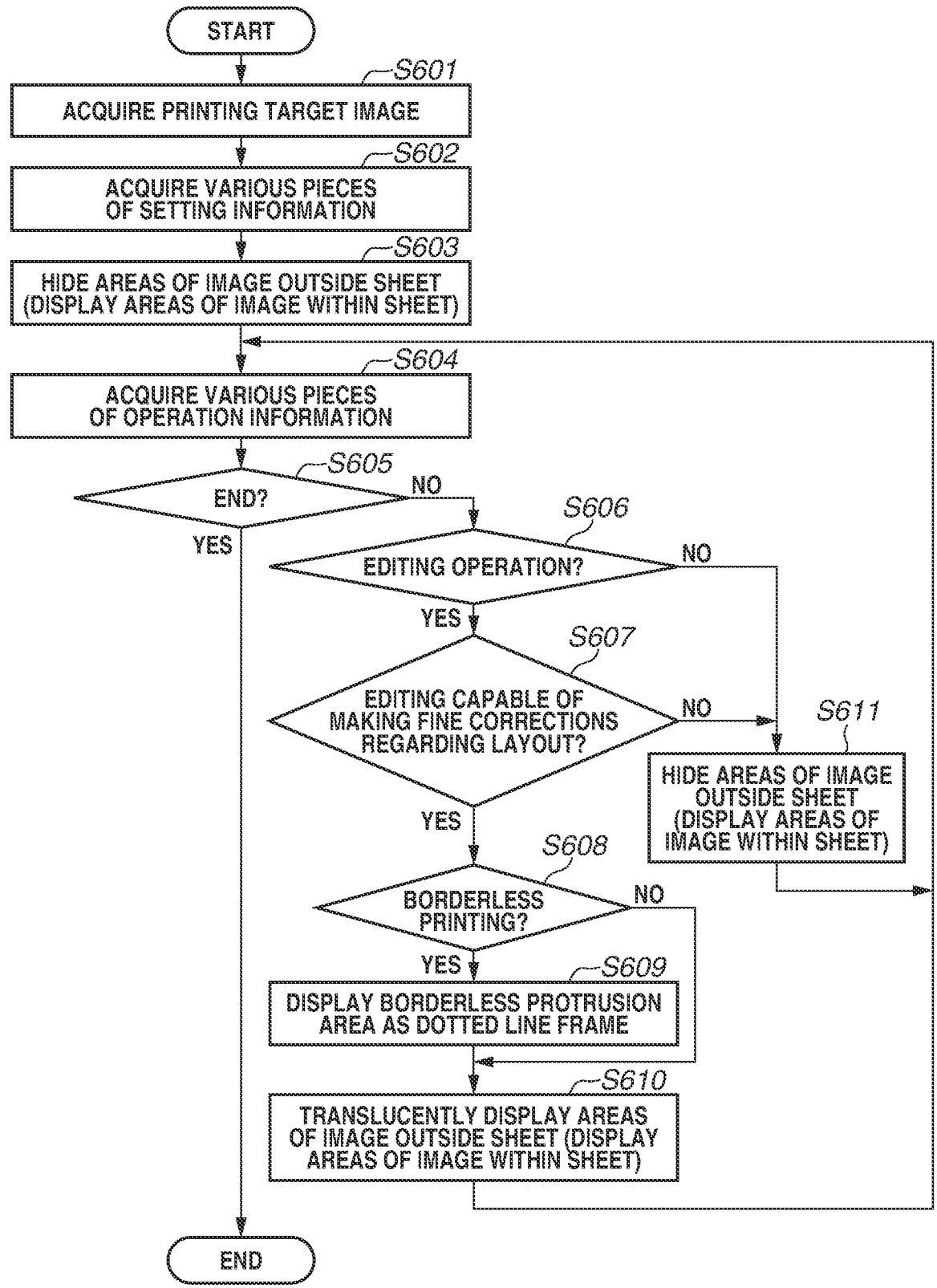
FIG. 6 is a flowchart for determining print layout representation to be displayed on the application screen.

FIG. 6 is a flowchart for determining display regarding the placement (layout) of an image that is changed according to an editing operation of the user (hereinafter, "print layout representation") to be displayed on the screen of the application 202. The flowchart in FIG. 6 is started based on the fact that the user becomes able to perform an operation on the screen of the application 202, such as in a case where the editing screen in FIG. 3 is displayed. Based on the fact that the user performs the operation of displaying the editing screen as illustrated in FIG. 3, the application 202 executes a display control process for displaying the editing screen. In the following description, the application 202 may perform each process, but actually, a corresponding function is achieved by a processor such as the CPU 111 in the host 101 executing a corresponding program. All the processing is not necessarily sequentially executed in a single process, and there can also be a case where the processing is transferred to the OS once and called by the OS again. This flowchart is merely a flow simply illustrating the main processing for convenience.

In step S601, the application 202 acquires an input (inserted) image.

Specifically, based on a user operation, the application 202 acquires an image specified by the user, as the image 309 as a printing target from the external storage device 114 via the RAM 113. For example, the operation for inputting the image to the application 202 is the operation of opening an explorer from a file menu (not illustrated) of the application 202 and inputting an image selected from a list of images. Alternatively, for example, the operation for inputting the image to the application 202 is a drag-and-drop operation for directly inputting the image to the screen of the application 202.

In step S602, the application 202 acquires editing setting information in the editing setting area 310 set by the user. Specifically, the setting information in the editing setting area 310 set by the user is saved in the external storage device 114 or the RAM 113, and the application 202 acquires the saved editing setting information. The application 202 also acquires information regarding the value of the borderless protrusion area 501 required for the borderless printing from the printer driver 203. Consequently, the application 202 can display an object indicating the borderless protrusion area 501 for performing the borderless printing at an accurate position on the preview area 307.

In step S603, the application 202 displays only areas of the image 309 that fall within the sheet areas 308 without displaying areas of the image 309 that protrude outside from the sheet areas 308. The details will be described below with reference to FIG. 7.

In step S604, the application 202 acquires information regarding an operation performed on the screen of the application 202 by the user. The information regarding the operation performed by the user is acquired from the OS 201. Also in a case where the editing setting information in the editing setting area 310 is changed, the changed editing setting information is acquired as the information regarding the operation performed by the user.

In step S605, the application 202 determines whether an instruction to end the editing of the divided poster printing or an instruction to end the application 202 is received. The instruction to end the editing of the divided poster printing is, for example, an instruction to transition from the editing screen of the application 202 in FIG. 3 to another screen. For example, the application 202 determines whether the user presses a "return to home" button (not illustrated) of the application 202 in FIG. 3, In the determination of the instruction to end the application 202, for example, the application 202 determines whether the user presses an "end" button 320 of the application 202 in FIG. 3. If the determination is YES in step S605 (YES in step S605), this flowchart ends. If the determination is NO in step S605 (NO in step S605), the processing proceeds to step S606.

In step S606, the application 202 determines whether the screen of the application 202 receives an editing operation. Specifically, based on the information regarding the operation of the user acquired in step S604, the application 202 determines whether the screen of the application 202 receives the operation. The details will be described below with reference to FIG. 7. If the determination is YES in step S606 (YES in step S606), the processing proceeds to step S607. If the determination is NO in step S606 (NO in step S606), the processing proceeds to step S611.

In step S607, based on the information regarding the operation of the user acquired in step S604, the application 202 determines whether the operation of the user is an editing operation capable of making fine corrections regarding the layout of the image 309 as the printing target. The "editing operation capable of making fine corrections regarding the layout of the image 309 as the printing target" refers to, for example, the operation of performing print layout representation in (c) in FIG. 7. If the determination is YES in step S607 (YES in step S607), the processing proceeds to step S608. If the determination is NO in step S607 (NO in step S607), the processing proceeds to step S611.

In step S608, the application 202 determines whether the borderless printing is set for the image 309 as the printing target. Specifically, based on the information in the editing setting area 310 acquired in step S602 or S604, the application 202 determines whether the "borderless printing" setting 314 is "on". If the determination is YES in step S608 (YES in step S608), the processing proceeds to step S609. If the determination is NO in step S608 (NO in step S608), the processing proceeds to step S610.

In step S609, the application 202 displays (outputs) the object indicating the borderless protrusion area 501 outside the sheet areas 308. The object indicating the borderless protrusion area 501 is displayed at a position based on the information regarding the value of the borderless protrusion area 501 required for the borderless printing that is acquired by the application 202 in step S602. The details will be described below with reference to FIG. 7. The object indicating the borderless protrusion area 501 is displayed as a dotted line, but may be displayed in another form instead of the dotted line. Then, the processing proceeds to step S610.

In step S610, the application 202 translucently displays areas of the image 309 that protrude outside from the sheet areas 308. The details will be specifically described below with reference to FIG. 7. The areas of the image 309 that protrude outside from the sheet areas 308 may be displayed not translucently, but may be displayed in another form. Then, the processing returns to step S604.

If the determination is NO in step S606 or if the determination is NO in step S607, then in step S611, the application 202 displays only areas of the image 309 that fall within the sheet areas 308 without displaying areas of the image 309 that protrude outside from the sheet areas 308. The application 202 does not display the object indicating the borderless protrusion area 501. The details will be described below with reference to FIG. 7. Then, the processing returns to step S604.

With reference to FIGS. 5A to 5G, 7, 8, and 9A to 9C, the flowchart in FIG. 6 is described in detail.

Figure 8:
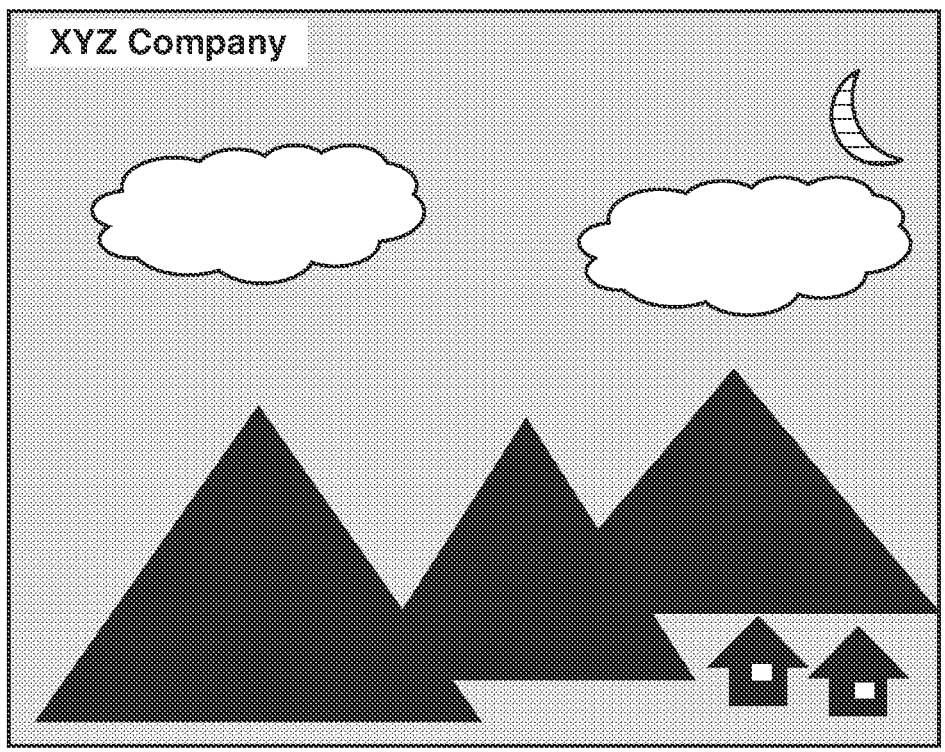
FIG. 8 is an example of an input image.
Figure 9A:
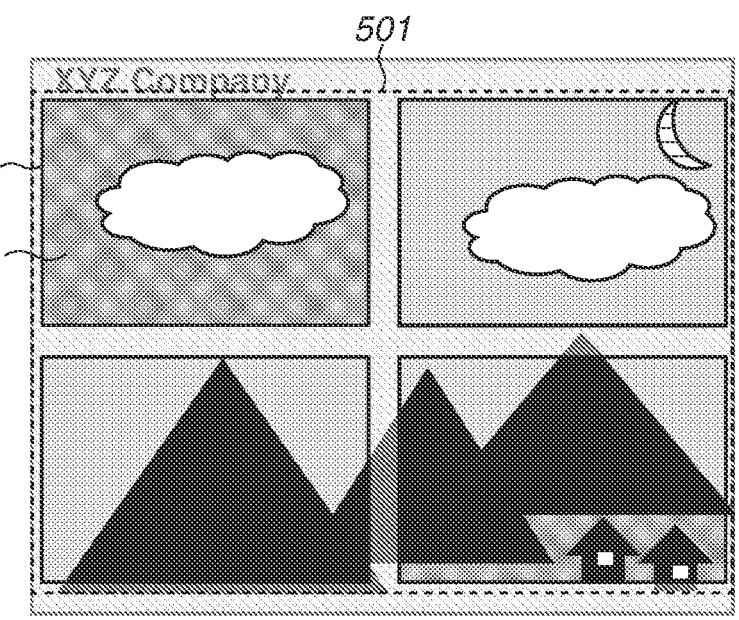
FIGS. 9A to 9C are examples of print layout representation displayed on the application screen.
Figure 9B:
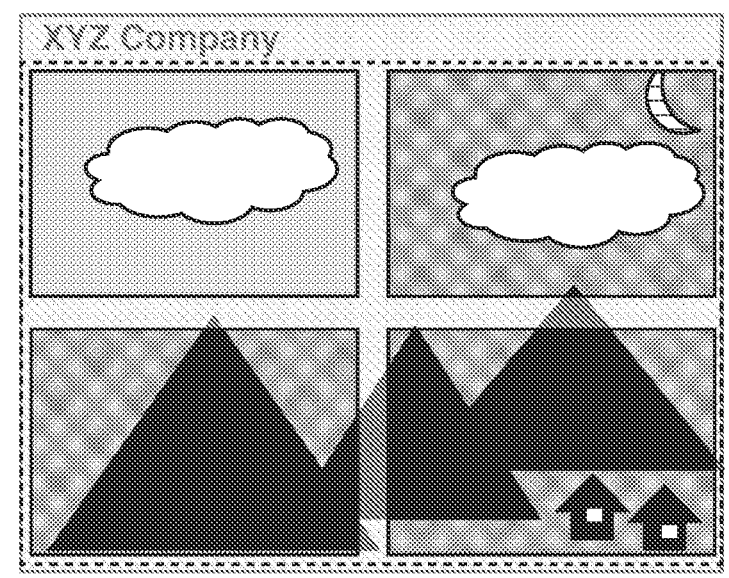
Figure 9C:
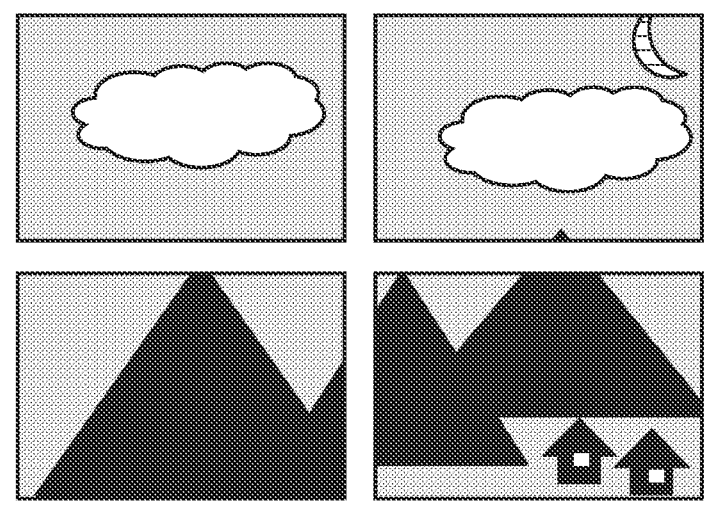

FIG. 7 is a table illustrating print layout representation to be displayed according to an operation regarding the layout of an image. FIGS. 9A to 9C are examples of print layout representation to be displayed in the preview area 307 of the application screen. In FIGS. 9A to 9C, an image illustrated in FIG. 8 is displayed as the image 309. As the sheet areas 308, "horizontal" is set in the "direction of sheet" setting 313, and "2" and "2" are set in the "number of divisions" settings 315 and 316, respectively.

In FIG. 7, (a) indicates print layout representation to be displayed in a case where the screen of the application 202 does not receive the editing operation from the user in step S606, i.e., to be displayed in step S611. The "editing operation" refers to an editing operation on the screen of the application 202 including an operation on the toolbar or the editing setting area 310 in FIG. 3, and the editing operation capable of making fine corrections regarding the layout of the image 309 as the printing target in (b) and (c) in FIG. 7. In the print layout representation in (a) in FIG. 7, areas of the image 309 that protrude outside from the sheet areas 308 are hidden. For example, as illustrated in FIGS. 5A, 5B, and 5C, areas of the image 309 that protrude outside from the sheet areas 308 are not displayed, and only areas of the image 309 that fall within the sheet areas 308 are displayed. The application 202 does not display the object indicating the borderless protrusion area 501, either. Consequently, a user who does not perform the editing operation can recognize the completed form of a work in the divided poster printing in the preview area 307.

In FIG. 7, (b) indicates layout representation in a case where it is determined in step S607 that the screen of the application 202 does not receive the editing operation capable of making fine corrections regarding the layout of the image 309 as the printing target from the user. That is, this indicates print layout representation to be displayed in step S611. The "editing operation capable of making fine corrections regarding the layout of the image 309 as the printing target" refers to the operation of changing the coordinates (the position) or the size of the image 309 manually, not automatically. For example, the editing operation corresponds to at least one of the operations of moving, enlarging or reducing, cropping, and rotating the image 309. Thus, an operation other than the editing operation capable of making fine corrections regarding the layout of the image 309 as the printing target corresponds to the operation of automatically determining the position or the size of the image 309 when a button on the toolbar or in the editing setting area 310 is pressed. For example, the operation other than the editing operation capable of making fine corrections regarding the layout of the image 309 as the printing target corresponds to the inscribed fit executed by pressing the "fit" button 303 or the circumscribed fit executed by pressing the "fit without margin" button 304. An operation regarding color processing, which is an operation that does not change coordinates, also corresponds to the operation other than the editing operation capable of making fine corrections regarding the layout of the image 309 as the printing target. In the print layout representation in (4) in FIG. 7, areas of the image 309 that protrude outside from the sheet areas 308 are hidden. For example, as illustrated in FIGS. 5A, 5B, and 5C, areas of the image 309 that protrude outside from the sheet areas 308 are not displayed, and only areas of the image 309 that fall within the sheet areas 308 are displayed. The application 202 does not display the object indicating the borderless protrusion area 501, either. Consequently, a user who does not perform the editing operation capable of making fine corrections regarding the layout of the image 309 as the printing target can recognize the completed form of a work in the divided poster printing in the preview area 307.

In FIG. 7, (c) indicates print layout representation to be displayed in a case where it is determined in step S607 that the screen of the application 202 receives the editing operation capable of making fine corrections regarding the layout of the image 309 as the printing target from the user. That is, this indicates print layout representation to be displayed in step S610. In the print layout representation in (c) in FIG. 7, areas of the image 309 that protrude outside from the sheet areas 308 are translucently displayed. For example, as illustrated in FIGS. 5D, 5E, 5F, and 5G, areas of the image 309 that protrude outside from the sheet areas 308 are translucently displayed. Further, if it is determined in step S608 that the borderless printing is set for the image 309 as the printing target, for example, as illustrated in FIGS. 5D and 5E, further, the borderless protrusion area 501 is displayed as a dotted line. That is, this indicates print layout representation to be displayed in step S610 via step S609. The timing when the print layout representation in (c) in FIG. 7 is performed is, for example, the timing when the image 309 is selected by a click operation using the mouse. Alternatively, the timing may be the timing when a movement such as a drag operation is started by the user after the image 309 is selected, or may be the timing when a part of the image 309 comes into contact with an end portion of any of the sheet areas 308. Further, the timing may be the timing when a button (not illustrated) that enables the cropping operation or the rotation operation is pressed on the toolbar before the image 309 is selected.

With reference to FIGS. 9A to 9C, a detailed description is given of a case where the editing operation capable of making fine corrections regarding the layout of the image 309 as the printing target is performed. FIGS. 9A to 9C illustrate a case where the "borderless printing" setting 314 is "on" and the "fit without margin" button 304 is set. A user who wishes to determine areas to be subjected to printing in the borderless printing needs to finely adjust areas of the image 309 that protrude from the sheet areas 308 while confirming the borderless protrusion area 501, Specifically, a description is given using as an example a case where the user wishes not to print the character string "XYZ Company" in the image 309 in FIG. 8, if the "fit without margin" button 304 is merely pressed for the image 309, then as illustrated in FIG. 9A, a part of the character string may be included in the sheet areas 308 and printed. Thus, the user needs to make fine adjustments by the movement or the enlargement/reduction of the image 309. FIG. 9A illustrates areas of the image 309 that protrude from the sheet areas 308 and the object indicating the borderless protrusion area 501 for illustrative purposes, but is not a diagram illustrating a display state.

FIG. 9B illustrates print layout representation to be displayed on the screen of the application 202 while the image 309 is moved (operated). While the image 309 is moved, areas of the image 309 that protrude from the sheet areas 308 are translucently displayed, and the object indicating the borderless protrusion area 501 is displayed. Thus, the user can make fine adjustments regarding the position of the image 309 while confirming the position where the character string is not printed, FIG. 9C illustrates print layout representation to be displayed on the screen of the application 202 after the movement of (the operation on) the image 309 ends. After the movement of the image 309 ends, and if the operation of cancelling the selection of the image 309 is received, areas of the image 309 that protrude from the sheet areas 308 and the object indicating the borderless protrusion area 501 are not displayed. That is, while an operation on the image 309 on the editing screen in FIG. 3 is performed, the application 202 can display the object indicating the borderless protrusion area 501. Then, if the operation on the image 309 is completed, the application 202 can hide the object indicating the borderless protrusion area 501. Thus, the user can recognize the completed form of the image 309 to be subjected to the divided poster printing in the preview area 307.

As described above, in the present exemplary embodiment, in a case where an operation on the screen of the application 202 is performed, areas of an image that protrude from sheet areas and an object indicating a borderless protrusion area are displayed, Consequently, appropriate display is performed according to the application of the user. This improves usability in a case where an operation regarding an image is performed. For example, a user who wishes to confirm the completed form of an image to be ultimately printed without using the borderless protrusion area can appropriately confirm the completed form of the image. Moreover, for example, for a user who does not recognize the borderless protrusion area, visibility improves. In the present exemplary embodiment, in a case where an editing operation capable of mating fine corrections regarding the layout of an image as a printing target is performed, areas of the image that protrude from sheet areas and an object indicating a borderless protrusion area are displayed. Thus, in a case where a user who wishes to make fine corrections regarding the layout of an image performs the above operation capable of making fine corrections, areas of the image that protrude from sheet areas and an object indicating a borderless protrusion area are displayed. Then, in a case where the operation capable of making fine corrections is completed, areas of the image that protrude from the sheet area and the object indicating the borderless protrusion area are not displayed, Consequently, appropriate display is performed according to the content of the operation of the user. This improves visibility and therefore improves usability in a case where an operation regarding the layout of an image is performed.

In the present exemplary embodiment, a form may be employed in which in an initial state in a case where the image 309 is input to the application 202, or when the setting of the number of divisions on a page is changed, the inscribed fit or the circumscribed fit is automatically performed on the image 309. That is, even in a case where the operation of enabling the inscribed fit or the operation of enabling the circumscribed fit is not performed, the inscribed fit or the circumscribed fit is automatically performed on the image 309. Consequently, a user who does not recognize the borderless printing does not need to be conscious of the borderless protrusion area 501. This can further improve usability.

In the present exemplary embodiment, even if the borderless printing is set, there is a case where a margin is generated within the borderless protrusion area 501. Thus, an editing operation that generates a margin within the borderless protrusion area 501 may be prohibited. Specifically, for example, a form may be employed in which if the "borderless printing" setting 314 is "on", the "fit" button 303 cannot be turned on, and the inscribed fit cannot be performed.

For example, a form may be employed in which at least one of the operations of moving, enlarging or reducing, cropping, and rotating the image 309 to generate a margin within the borderless protrusion area 501 may be prohibited. This can reduce the situation where the borderless printing cannot be achieved due to an error in an editing operation.

Further, in the present exemplary embodiment, in a case where the borderless printing is set and the editing operation capable of making fine corrections regarding the layout of the image 309 as the printing target is received, the object indicating the borderless protrusion area 501 is displayed. However, in a case where the borderless printing is set and a setting is changed in the editing setting area 310 in FIG. 3, the object indicating the borderless protrusion area 501 may be displayed. For example, in a case where the printer driver 203 corresponding to the printer 201 that prints a printing target is changed in the setting 311, the object indicating the borderless protrusion area 501 may be displayed on the editing screen. This enables the user to easily recognize the borderless protrusion area 501 corresponding to the printer driver 203 after the change.

Further, in the present exemplary embodiment, an example has been illustrated where the application 202 achieves an editing operation regarding print layout. Alternatively, after printing is performed from the application 202, a print preview module (not illustrated) included in the printer driver 203 may execute this processing.

Further, the application 202 does not necessarily need to operate via the printer driver 203, and may acquire information directly from the printer 102 and give an instruction to execute printing.

In the first exemplary embodiment, the application 202 is an application capable of performing the divided poster printing, and the borderless printing in the divided poster printing has been described.

In a second exemplary embodiment, a description is given of an application that prints an image inserted into a template as an example of the application 202. For example, suppose that there is a plurality of template frames (hereinafter, "layout frames") into which images are inserted, and there is a template into which one or more images are inserted. The layout frames include a layout frame that is in contact with an end portion of a sheet and a layout frame that is not in contact with an end portion of the sheet. In a case where the user performs an editing operation on an image inserted into the layout frame that is not in contact with the end portion of the sheet, the user does not need to take into account a range outside a sheet area. Thus, it is desirable to hide an area of the image outside the sheet area. On the other hand, in a case where the user performs an editing operation on an image inserted into the layout frame that is in contact with the end portion of the sheet, it is desirable to also display an area of the image outside the sheet area and a borderless protrusion area so that the user can accurately determine the range of the image to be printed. Thus, in the present exemplary embodiment, a description is given of a form in which according to a layout frame in which an editing operation regarding an image is performed, an area of the image outside a sheet area and an object indicating a borderless protrusion area are displayed. This improves usability in a case where an image inserted into a template is subjected to the borderless printing. The application 202 according to the first exemplary embodiment may have the function of printing an image inserted into a print template. In the second exemplary embodiment, a description is not given with reference to a diagram as in the setting area 310 in FIG. 3. However, a setting screen that receives a setting content required for the application according to the second exemplary embodiment may be displayed.

Figure 10:
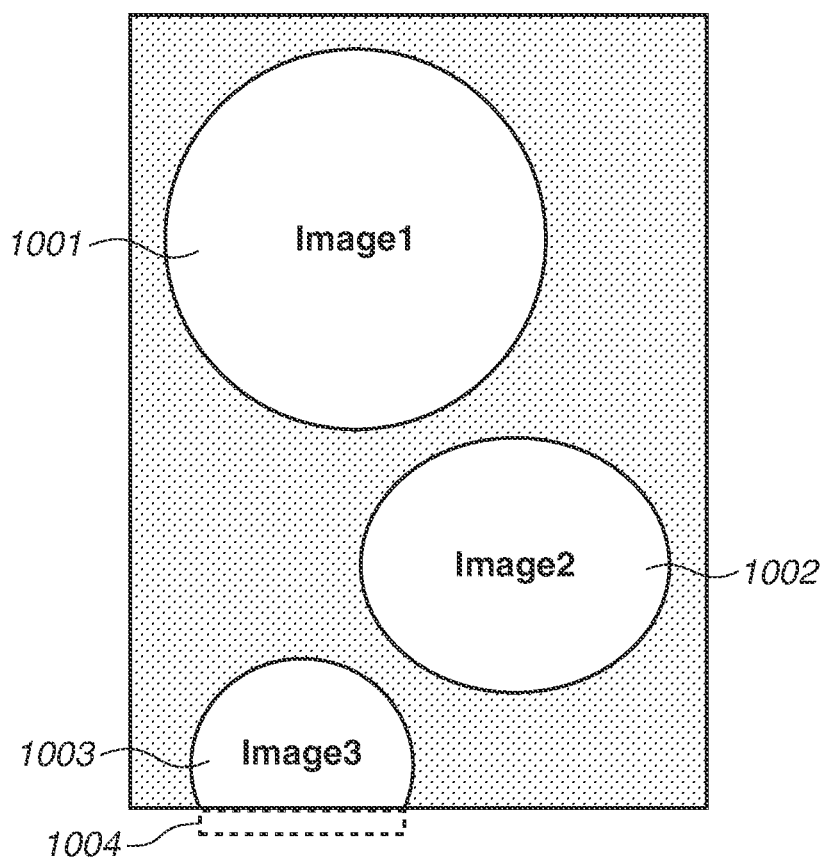
FIG. 10 is an example of print layout representation displayed on an application screen.

FIG. 10 is an example of print layout representation displayed on a screen of the application. FIG. 10 illustrates image layout frames 1001, 1002, and 1003 and an object (hereinafter, "frame object") 1004 indicating a borderless protrusion area.

Figure 11:
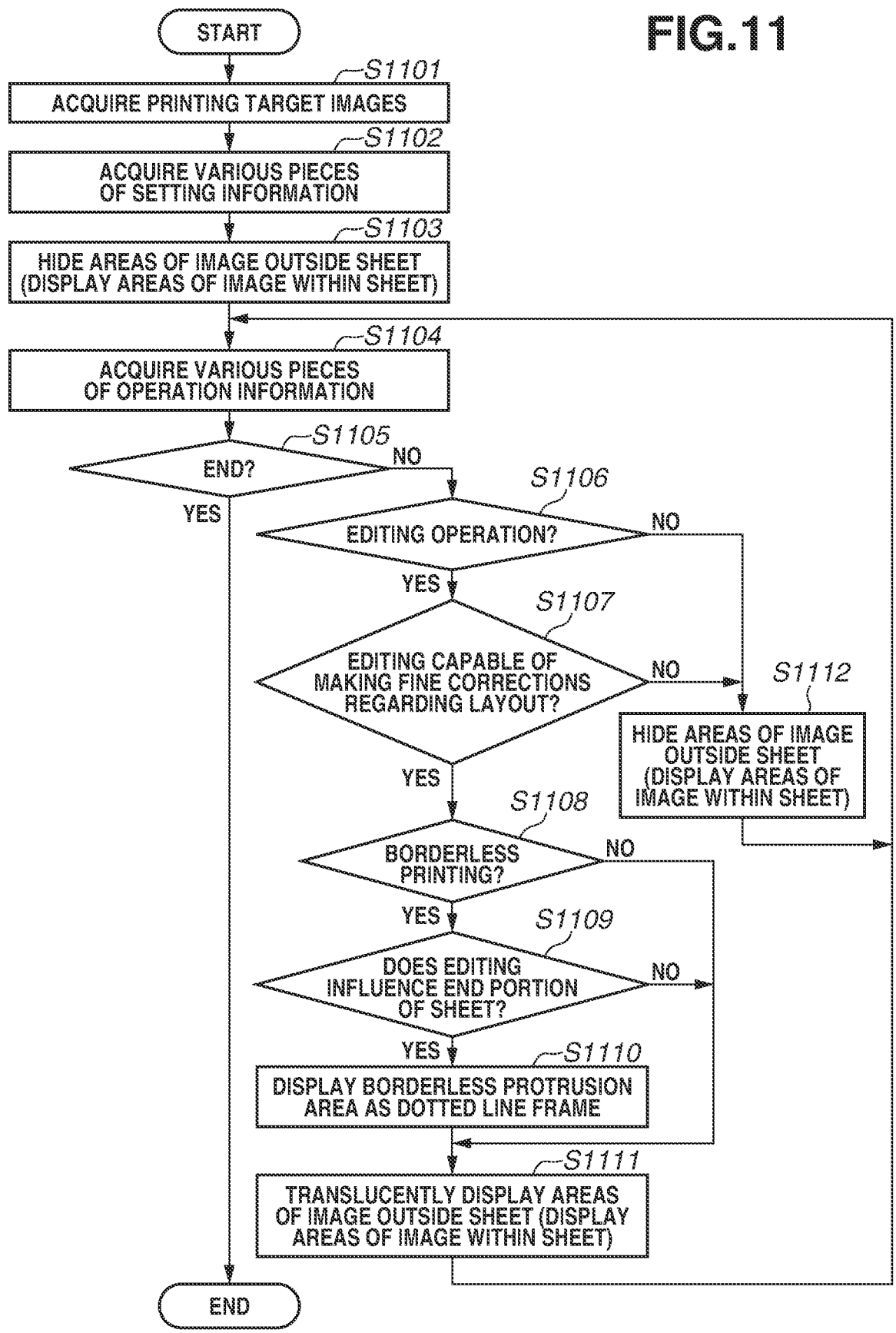
FIG. 11 is a flowchart for determining print layout representation to be displayed on the application screen.

FIG. 11 is a flowchart for determining print layout representation to be displayed on the screen of the application. The flowchart in FIG. 11 is started based on the fact that the user becomes able to perform an operation on the screen of the application 202, such as in a case where an editing screen of the application 202 according to the present exemplary embodiment is displayed. Based on the fact that the user performs the operation of displaying the editing screen, the application 202 executes a display control process for displaying the editing screen. In the following description, the application 202 may perform each process, but actually, a corresponding function is achieved by a processor such as the CPU 111 in the host 101 executing a corresponding program.

In step S1101, the application 202 acquires one or more input (inserted) images 309. For example, the application 202 acquires images inserted into the image layout frames 1001, 1002, and 1003 in FIG. 10. The specific acquisition method is similar to that in step S601. The images inserted into the image layout frames 1001, 1002, and 1003 may be the same as or different from each other.

In step S1102, the application 202 acquires editing setting information in an editing setting area set by the user. Specifically, the setting information in the editing setting area set by the user is saved in the external storage device 114 or the RAM 113, and the application 202 acquires the saved editing setting information. The application 202 also acquires information regarding the value of the frame object 1004 from the printer driver 203. Consequently, the application 202 can display the frame object 1004 indicating an area for performing the borderless printing at an accurate position on a preview area.

The processes of steps S1103 to S1108 are similar to those of steps S603 to S608, and therefore are not described.

In step S1109, based on the information regarding the operation of the user acquired in step S1104, the application 202 determines whether the editing operation on the images is an editing operation on an image inserted into a layout frame that is in contact with an end portion of a sheet. For example, the application 202 determines whether the editing operation on the images is an editing operation on an image inserted into the layout frame 1003 in FIG. 10. If the determination is YES in step S1109 (YES in step S1109), the processing proceeds to step S1110. If the determination is NO in step S1109 (NO in step S1109), the processing proceeds to step S1111.

In step S1110, the application 202 displays (outputs) the frame object 1004 outside a sheet area. Further, as illustrated in the frame object 1004 in FIG. 10, the application 202 displays the frame object 1004 for the layout frame 1003 that is in contact with the end portion of the sheet. The frame object 1004 is displayed at a position based on the information regarding the value of the frame object 1004 required for the borderless printing that is acquired by the application 202 in step S1102. The frame object 1004 is displayed as a dotted line, but may be displayed in another forum instead of the dotted line. Then, the processing proceeds to step S1111.

The processes of steps S1111 to S1112 are similar to those of steps S610 to S611, and therefore are not described.

As described above, in the present exemplary embodiment, according to a layout frame in which an editing operation regarding an image is pen an area of the image outside a sheet area and a borderless protrusion area are displayed. Specifically, in a case where an editing operation is performed on an image in a layout frame that is in contact with an end portion of a sheet, an area of the image outside a sheet area and an object indicating a borderless protrusion area are displayed. Consequently, in a case where an editing operation regarding an image in a layout frame that is not in contact with an end portion of the sheet is performed, it is possible to reduce unnecessary display. This can improve usability in a case where an image inserted into a template is subjected to the borderless printing.

Other Exemplary Embodiments

In the above exemplary embodiments, a description has been given of a form in which printing is performed on a sheet. Alternatively, the processing of the above exemplary embodiments may be performed when an image is printed not only on a sheet but also on a recording medium of film or cloth.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-108170, filed Jun. 29, 2021, which is hereby incorporated by reference herein in its entirety.

What is claimed is:

1. An information processing method comprising:
   setting for receiving a setting for enabling borderless printing;
   displaying control for displaying an editing screen including an image as an editing target and a recording medium area; and
   controlling for, in a case where the borderless printing is set and an operation on the editing screen is received, displaying an object indicating an area for the borderless printing outside the recording medium area on the editing screen, and in a case where the operation on the editing screen is not received, not displaying the object indicating the area for the borderless printing outside the recording medium area on the editing screen.

2. The information processing method according to claim 1, wherein while an operation on the image on the editing screen is performed, the object is displayed, and in a case where the operation on the image on the editing screen is completed, the object is not displayed.

3. The information processing method according to claim 1, wherein in a case where the borderless printing is set and a first operation regarding the image is received, the object indicating the area for the borderless printing is displayed outside the recording medium area on the editing screen, and in a case where the borderless printing is set and a second operation regarding the image different from the first operation regarding the image is received, the object indicating the area for the borderless printing is not displayed outside the recording medium area on the editing screen.

4. The information processing method according to claim 3, wherein the first operation is an editing operation regarding the image that is performed manually, not automatically.

5. The information processing method according to claim 4, wherein the first operation includes at least one of an operation of moving the image, an operation of enlarging or reducing the image, an operation of clipping the image, or an operation of rotating the image.

6. The information processing method according to claim 3, wherein the second operation is an editing operation regarding placement of the image that is performed automatically, not manually.

7. The information processing method according to claim 6,
   wherein the second operation includes at least one of an operation of enabling an inscribed fit or an operation of enabling a circumscribed fit, and
   wherein the inscribed fit is a function of overlapping two sides of the image and two sides of the object indicating the area for the borderless printing and enabling four sides of the image to fall within the area for the borderless printing, and the circumscribed fit is a function of overlapping two sides of the image and two sides of the object indicating the area for the borderless printing and enabling the other two sides of the image to be placed outside the area for the borderless printing.

8. The information processing method according to claim 7, wherein even in a case where the operation of enabling the inscribed fit or the operation of enabling the circumscribed fit is not performed, the image displayed on the editing screen by the display control is displayed in a state where the inscribed fit or the circumscribed fit is performed on the image.

9. The information processing method according to claim 3, wherein in a case where an operation on the editing screen including the first and second operations is not performed, or in a case where the second operation is performed, an area of the image that protrudes from the recording medium area is not displayed on the editing screen.

10. The information processing method according to claim 3, wherein in a case where the first operation is performed, an area of the image that protrudes from the recording, medium area is translucently displayed on the editing screen.

11. The information processing method according to claim 3, wherein in a case where the setting for enabling the borderless printing is not received and the first operation is performed, an area of the image that protrudes from the recording medium area is translucently displayed on the editing screen, and the object indicating the area for the borderless printing is not displayed on the editing screen.

12. The information processing method according to claim 3,
   wherein in a case where a frame into which the image is inserted is created in the recording medium area and the first operation is received on an image inserted into a frame that is in contact with an end portion of the recording medium area, a frame object indicating the area for the borderless printing is displayed outside the recording medium area on the editing screen, and
   wherein in a case where the first operation is received on an image inserted into a frame that is not in contact with an end portion of the recording medium area, the frame object is not displayed outside the recording medium area on the editing screen.

13. The information processing method according to claim 1, wherein in a case where the setting for enabling the borderless printing is received, an operation that generates a margin within the area for the borderless printing is not received.

14. The information processing method according to claim 13,
   wherein the operation that generates a margin within the area for the borderless printing is an operation of enabling an inscribed fit, and wherein the inscribed fit is a function of overlapping two sides of the image and two sides of the object indicating the area for the borderless printing and enabling four sides of the image to fall within the area for the borderless printing.

15. The information processing method according to claim 1, wherein in a case where there is a plurality of the recording medium areas, the object indicating the area for the borderless printing is displayed with respect to each of the plurality of the recording medium areas, or the single object indicating the area for the borderless printing is displayed for the plurality of the recording medium areas.

16. The information processing method according to claim 1, wherein the area for the borderless printing is equivalent to a printing area where a printing apparatus performs printing by protruding from a recording medium using a print job based on the image as the editing target.

17. The information processing method according to claim 1, wherein in a case where an instruction to perform printing using the image as the editing target is given, a print job is generated based on an image corresponding to the area for the borderless printing placed outside the recording medium area.

18. The information processing method according to claim 1, wherein the area for the borderless printing is an area that prevents generation of a border on at least two sides of a print product in a case where printing is executed according to a print job based on the image as the editing target.

19. The information processing method according to claim 1, wherein the setting for enabling the borderless printing is a setting for enabling an image to be printed without generating a border in end portions on at least two sides of a recording medium.

20. An information processing apparatus comprising:
a setting unit configured to receive a setting for enabling borderless printing;
a display control unit configured to display an editing screen including an image as an editing target and a recording medium area; and
a control unit configured to, in a case where the borderless printing is set and an operation on the editing screen is received, display an object indicating an area for the borderless printing outside the recording medium area on the editing screen, and in a case where the operation on the editing screen is not received, not display the object indicating the area for the borderless printing outside the recording medium area on the editing screen.

21. A non-transitory computer readable storage medium that stores a program for causing a computer to execute an information processing method, the method comprising:
setting for receiving a setting for enabling borderless printing;
displaying control for displaying an editing screen including an image as an editing target and a recording medium area; and
controlling for, in a case where the borderless printing is set and an operation on the editing screen is received, displaying an object indicating an area for the borderless printing outside the recording medium area on the editing screen, and in a case where the operation on the editing screen is not received, not displaying the object indicating the area for the borderless printing outside the recording medium area on the editing screen.

* * * * *